United States Patent
Keller et al.

(10) Patent No.: US 9,521,590 B2
(45) Date of Patent: Dec. 13, 2016

(54) MULTI-BEARER CONNECTION CONTROL

(71) Applicant: Telefonaktiebolaget L M Ericsson (publ), Stockholm (SE)

(72) Inventors: Ralf Keller, Würselen (DE); Ann-Christine Sander, Göteborg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 234 days.

(21) Appl. No.: 14/178,549

(22) Filed: Feb. 12, 2014

(65) Prior Publication Data

US 2015/0223121 A1 Aug. 6, 2015

Related U.S. Application Data

(63) Continuation of application No. PCT/EP2014/052315, filed on Feb. 6, 2014.

(51) Int. Cl.
| | |
|---|---|
| *H04W 36/00* | (2009.01) |
| *H04W 36/28* | (2009.01) |
| *H04W 76/02* | (2009.01) |
| *H04W 76/04* | (2009.01) |
| *H04W 72/10* | (2009.01) |
| *H04L 12/851* | (2013.01) |
| *H04W 48/18* | (2009.01) |
| *H04W 72/04* | (2009.01) |
| *H04L 12/24* | (2006.01) |

(Continued)

(52) U.S. Cl.
CPC ..... *H04W 36/0022* (2013.01); *H04W 36/0027* (2013.01); *H04W 36/28* (2013.01)

(58) Field of Classification Search
CPC ............ H04W 36/0022; H04W 36/0027; H04W 76/025; H04W 76/026
See application file for complete search history.

(56) References Cited

U.S. PATENT DOCUMENTS

| | | | | |
|---|---|---|---|---|
| 2005/0013315 | A1* | 1/2005 | Rytina | H04L 12/5695 370/443 |
| 2006/0239229 | A1* | 10/2006 | Marinescu | H04W 36/0022 370/331 |

(Continued)

*Primary Examiner* — Charles C Jiang
*Assistant Examiner* — Peian Lou
(74) *Attorney, Agent, or Firm* — Myers Bigel, PA

(57) ABSTRACT

The present invention relates to a method of operating a radio access node (10) adapted to handle multiple bearers, a related radio access node (10), a method of operating a network control node (36) adapted to control the radio access node (10) handling multiple bearers, a communication system adapted to control multiple bearers, a computer program and a computer program product. Multiple bearers comprise a first packet switched bearer related to a voice service and at least one second packet switched bearer. Upon change of an operative condition for a first packet switched bearer a transfer of a voice service is initiated (S10) from the first packet switched bearer to a circuit switched bearer. This is followed by a decision (S12) on initiation of a handover for the second packet switched bearer, parallel to the transfer of the voice service, from a first packet switched access to a second packet switched access based on bearer control information indicating possibility of a parallel handover. The bearer control information is either pre-configured at the radio access node (10) or received from the network control node (36).

27 Claims, 10 Drawing Sheets

(51) Int. Cl.
*H04L 12/66* (2006.01)
*H04L 29/12* (2006.01)

(56) References Cited

U.S. PATENT DOCUMENTS

| | | | | |
|---|---|---|---|---|
| 2008/0279139 | A1* | 11/2008 | Beziot | H04W 28/24 370/329 |
| 2009/0213809 | A1* | 8/2009 | Kwon | H04W 36/0061 370/331 |
| 2011/0158121 | A1* | 6/2011 | Casati | H04W 36/0022 370/252 |
| 2012/0063414 | A1* | 3/2012 | Ramachandran | H04W 36/0022 370/331 |
| 2012/0069750 | A1* | 3/2012 | Xing | H04W 72/0486 370/252 |
| 2013/0128865 | A1* | 5/2013 | Wu | H04W 36/00 370/331 |
| 2015/0016381 | A1* | 1/2015 | Kaikkonen | H04W 48/18 370/329 |
| 2015/0148048 | A1* | 5/2015 | Jamadagni | H04W 48/18 455/445 |

\* cited by examiner

MULTI-BEARER CONNECTION CONTROL

CROSS REFERENCE TO RELATED APPLICATION

This application is a continuation of PCT International Application No. PCT/EP2014/052315, filed on 6 Feb. 2014, the disclosure and content of which is incorporated by reference herein in its entirety.

TECHNICAL FIELD

The present invention relates to a method of operating a radio access node adapted to handle multiple bearers, a related radio access node, a method of operating a network control node adapted to control a radio access node handling multiple bearers, a related network control node, a communication system comprising the radio access node and the network control node, a computer program and a computer program product.

BACKGROUND

Single Radio Voice Call Continuity SRVCC is a Long Term Evolution (LTE) functionality that allows a Voice over Internet Protocol (IP) (VoIP)/IP Multimedia Subsystem (IMS) call in the LTE packet domain to be transferred to a voice domain, e.g., Global System for Mobile Communications (GSM), Universal Mobile Telecommunications System (UMTS), or Code Division Multiple Access (CDMA) 1x. For an operator with a legacy cellular network who intends to deploy IMS/VoIP based voice services in conjunction with the rollout of the LTE network, Single Radio Voice Call Continuity SRVCC offers VoIP subscribers a coverage over a much larger area than would otherwise be available during rollout of the LTE network.

As shown in FIG. 1, a SRVCC-capable user terminal, here a user equipment UE, engaged in a voice call will determine that it moves away from the coverage area of a LTE network and inform the LTE network accordingly. The LTE network determines that the voice call needs to be moved to the legacy circuit domain and notifies a Mobile Switching Center (MSC) in the legacy circuit switched domain about the need to transfer the voice call from the packet switched domain to the legacy circuit switched domain. It is noted that "CS" denotes circuit switched and "PS" denotes packet switched.

As shown in FIG. 1, the MSC in the legacy circuit switched domain establishes a bearer path for the user terminal in the legacy circuit switched domain and notifies an IMS core that the call leg of the user terminal is moving from the packet switched domain to the legacy circuit switched domain. Also, the user terminal will switch its internal voice processing from VoIP to legacy circuit switched voice processing, and the voice call will continue.

As shown in FIG. 1, when the legacy circuit switched capable network also has an associated packet switching capability and supports concurrent circuit/packet switched operations, the subscriber's data service can as well be transferred to a packet switched domain of the legacy network in conjunction with the switching of the voice call from the packet switched domain to the circuit switched domain. In such a case when the voice call finishes and the user terminal re-enters LTE coverage, the packet switched data service can be re-transferred to the packet switched LTE network.

However, transfer of both circuit/packet switched services to the legacy network increases the likelihood of errors compared to the implementation of Single Radio Voice Call Continuity SRVCC alone. Reasons for this are increased signaling failure likelihood and handover complexity with respect to packet switched services. This is of particular relevance for specific type of calls, e.g., an IMS emergency call.

SUMMARY

In view of the above, a technical object of the present invention is to enable a differentiation in voice and data service transfer to networks offering circuit switched and packet switched capabilities.

According to a first aspect of the present invention there is provided a method of operating a radio access node adapted to handle multiple bearers as an association between a user terminal and a packet switched network domain of a core network. The multiple bearers comprise a first packet switched bearer related to a voice service and at least one second packet switched bearer. The method of operating the radio access node comprises a step of initiating a transfer of the voice service from the first packet switched bearer to a circuit switched bearer upon change of a service condition for the first packet switched bearer and a step of deciding on initiation of a handover of at least one second packet switched bearer, parallel to the transfer of the voice service, from a first packet switched access to a second packet switched access based on bearer control information indicating possibility of a parallel handover.

According to a second aspect of the present invention there is provided a radio access node adapted to handle multiple bearers as an association between a user terminal and a packet switched network domain of a core network. The multiple bearers comprise a first packet switched bearer related to a voice service and at least a second packet switched bearer. Further, the radio access node comprises at least one interface to establish a transmission link, at least one processor, and a memory comprising instructions to be executed by the at least one processor. The radio access node is adapted to initiate a transfer of the voice service from the first packet switched bearer to a circuit switched bearer upon change of a service condition for the first packet switched bearer and to decide on initiation of a handover of at least one second packet switched bearer, parallel to the transfer of the voice service, from a first packet switched access to a second packet switched access based on bearer control information indicating possibility of a parallel handover.

According to a third aspect of the present invention there is provided a method of operating a network control node that is adapted to control a radio access node handling multiple bearers as an association between a user terminal and a packet switched network domain of a core network. The multiple bearers comprise a first packet switched bearer related to a voice service and at least one second packet switched bearer. The method of operating a network control node comprises a step of generating bearer control information indicating a possibility for a handover of at least one second packet switched bearer from a first packet switched access to a second packet switched access. Here, the possibility for the handover is expressed under the condition that a transfer of the voice service is initiated from the first packet switched bearer to a circuit switched bearer upon change of a service condition for the first packet switched bearer. The method of operating a network control node further comprises a step of transmitting the bearer control information to the radio access node.

According to a fourth aspect of the present invention there is provided a network control node adapted to control a network node handling multiple bearers as an association between a user terminal and a packet switched network domain of a core network. Here, the multiple bearers comprise a first packet switched bearer related to a voice service and at least a second packet switched bearer. Further, the network control node comprises at least one interface to establish a transmission link, at least one processor, and a memory comprising instructions to be executed by the at least one processor. The network control node is adapted to generate bearer control information indicating a possibility for a handover of at least one second packet switched bearer from a first packet switched access to a second packet switched access. The possibility is expressed under the condition that a transfer of the voice service is initiated from the first packet switched bearer to a circuit switched bearer upon change of a service condition for the first packet switched bearer. Further, the network control node is adapted to transmit the generated bearer control information to the network node.

According to a fifth aspect of the present invention there is provided a communication system adapted to control multiple bearers as an association between a user terminal and a packet switched network domain of a core network. The multiple bearers comprise a first packet switched bearer related to a voice service and at least one second packet switched bearer. Further, the communication system comprising a radio access node according to the second aspect of the present invention and a network control node according to the fourth aspect of the present invention.

According to a sixth aspect of the present invention, there is provided a computer program which, when being executed by at least one processor of a network node, causes the network node to execute a method according to the first aspect of the present invention or according to the third aspect of the present invention.

According to a seventh aspect of the present invention, there is provided a computer program product, comprising program code to be executed by at least one processor of a network node, thereby causing the network node to execute a method according to the first aspect of the present invention or according to the third aspect of the present invention.

BRIEF DESCRIPTION OF DRAWINGS

In the following, the present invention will be explained with respect to the drawing in which.

DETAILED DESCRIPTION

Figure 1:
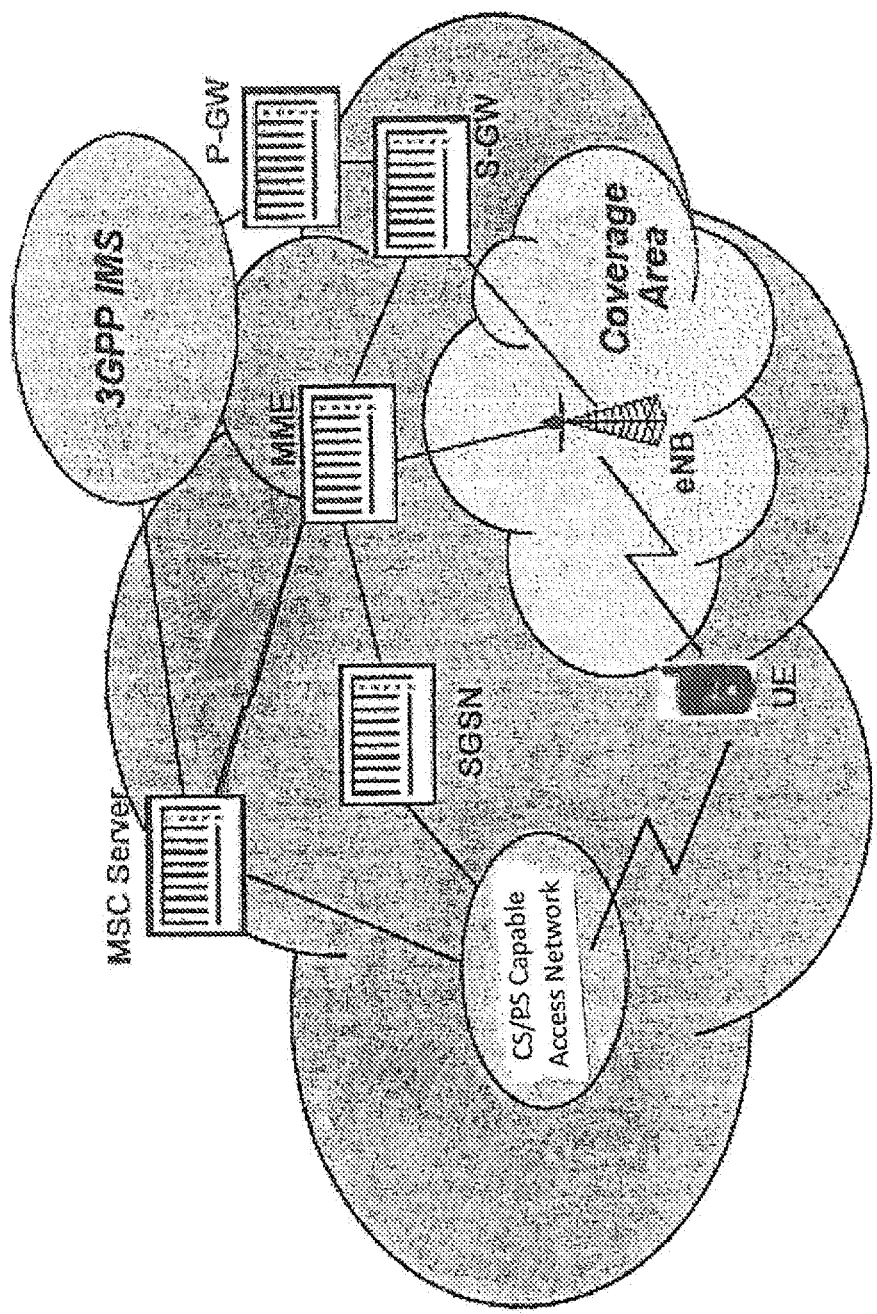
FIG. 1 shows an overview of Single Radio Voice Call Continuity SRVCC as technical background for the present invention.
Figure 2:
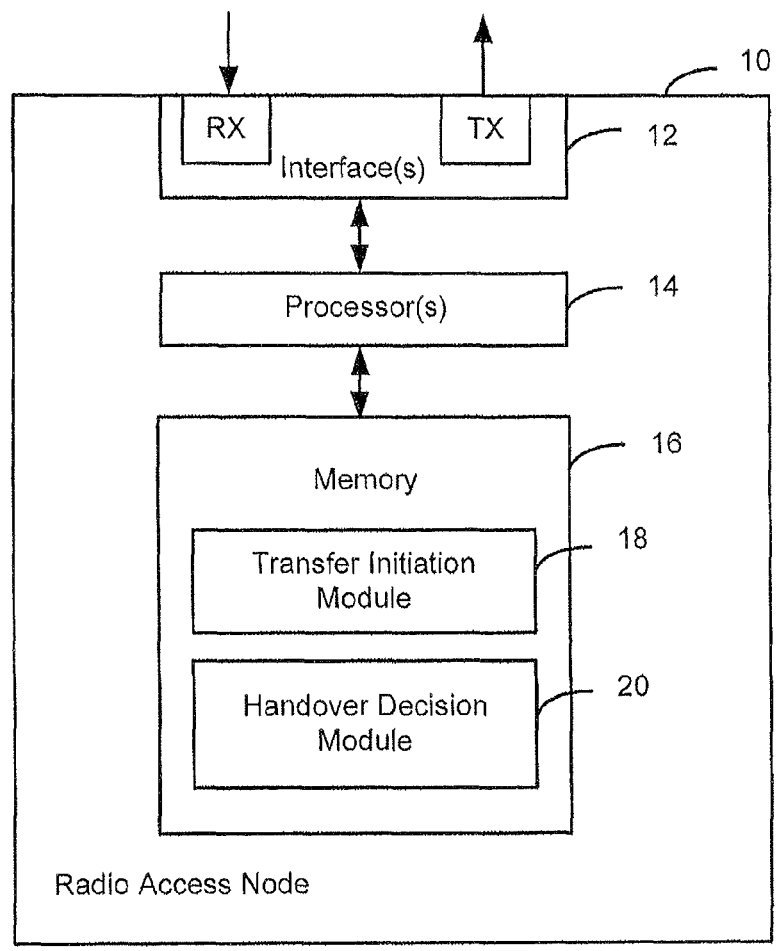
FIG. 2 shows a schematic diagram of a radio access node according to the present invention.

FIG. 2 shows a schematic diagram of a radio access node adapted to handle multiple bearers as an association between a user terminal and a packet switched network domain of a core network. The multiple bearers comprise a first packet switched bearer related to a voice service and at least one second packet switched bearer. It should be noted that FIG. 2 illustrates an exemplary structure which may be used for implementing the concepts underlying the present invention in a wireless network, e.g., a Node B, a Radio Network Controller (RNC) or an eNodeB.

As shown in FIG. 2, the radio access node 10 may include at least one interface 12, e.g., a radio interface. The interface 12 is suitable for wireless information exchange, e.g., with a user terminal such as a cellular phone, a tablet computer, etc. In some scenarios, the interface 12 may also be used for exchanging information with a further network node, e.g., a network controller, e.g., Radio Network Controller (RNC) or Mobility Management Entity (MME), in a wireless network. The information exchange can be wireless and/or wired. Alternatively, the network node 10 may comprise a further suitable interface configured for communication with a further network node and/or a network controller. RX represents a receiving capability of the at least one interface 12, and TX represents a sending capability of the at least one interface 12.

As shown in FIG. 2, the network node 10 comprises at least one processor 14 coupled to the interface 12 and a memory 16 coupled to the processor(s) 14. The memory 16 may include a read-only memory ROM, e.g., a flash ROM, a random access memory RAM, e.g., a dynamic RAM DRAM or a static RAM SRAM, a mass storage, e.g., a hard disc or solid state disc, or the like. The memory 16 also includes instructions, for example suitably configured program code to be executed by the processor(s) 14 in order to implement a later described functionality of the network node 10. This functionality will be referred to in the following as modules. It is noted that these modules do not represent individual hardware elements of the network node 10, but rather represent functionalities generated when the one or more processors 14 execute the suitably configured program code.

As shown in FIG. 2, the memory 16 may include suitably configured program code to implement a transfer initiation module 18 and a handover decision module 20. Further, the suitably configured program code in the memory 16 may also implement a control module for implementing various control functionalities, e.g., for controlling the network node 10 as to establishing and/or maintaining radio links, or the like.

Figure 3:
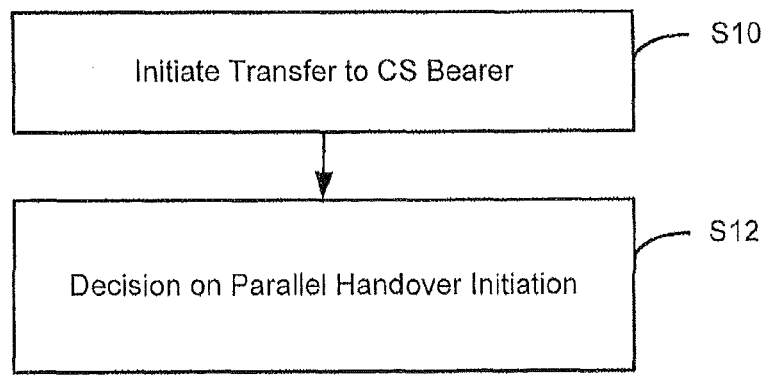
FIG. 3 shows a flowchart of operation for the radio access node shown in FIG. 2.

FIG. 3 shows a flowchart of operation for the network node 10 as shown in FIG. 2.

As shown in FIG. 3, initially there is executed a step S10 operatively being executed by the transfer initiation module 18 in cooperation with the processor(s) 14 to initiate a transfer of the voice service from the first packet switched bearer to a circuit switched bearer upon change of an operative condition for the first packet switched bearer.

As shown in FIG. 3, then follows a step S12 operatively being executed by the handover decision module 20 in cooperation with the processor(s) 14, to decide on initiation of a handover of at least one second packet switched bearer, parallel to the transfer of the voice service, from a first packet switched access to a second packet switched access based on bearer control information indicating possibility of a parallel handover.

In the following different options for set-up of the bearer control information at the radio network node 10 and further details of operation will be discussed with respect to FIGS. 4 to 8.

Generally, the step S10 of deciding on initiation of a handover for the at least one second packet switched bearer comprises declining the initiation of the handover or affirming the initiation of the handover.

The decision on initiation of a parallel handover in the step S10 may be performed for all second packet switched bearers handled by the radio access node 10. Therefore, a smooth transfer of the second packet switched bearers to a further packet switched access may be guaranteed.

The one or more second packet switched bearers may relate to signaling data for the voice service, particularly IMS signaling in a case in which the voice service is an IMS voice service, or may relate to an Internet service or any packet switched data service.

Further, packet switched payload data of the voice service or, in other words, packet switched voice packets may be transported along the first packet switched bearer. After transfer of the voice service to be transported via the circuit switched bearer, the data related to the voice service may be transformed into circuit switched payload data of the voice service or, in other words, circuit switched voice packets.

Further, the change of the operative condition for the first packet switched bearer may be a change of service coverage for the first packet switched bearer, a trigger from the core network, and/or a change of a traffic load on the first packet switched bearer above a predetermined threshold.

Figure 4:
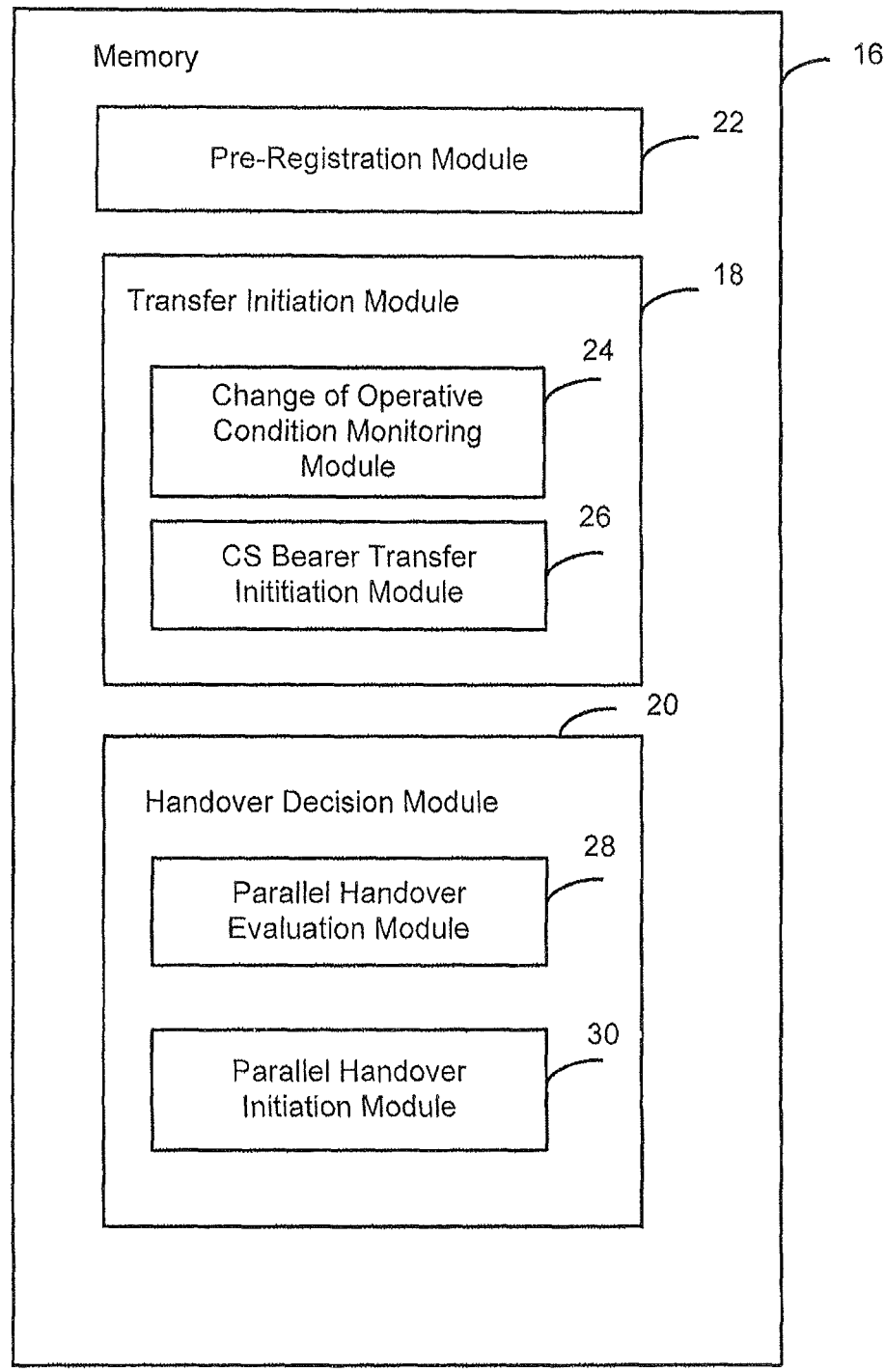
FIG. 4 shows a detailed schematic diagram of the memory shown in FIG. 1.

FIG. 4 shows a detailed schematic diagram of the memory shown in FIG. 2.

As shown in FIG. 4, in addition to the transfer initiation module 18 and the handover decision module 20 explained with respect to FIG. 2, the memory 16 also comprises a pre-registration module 22.

As also shown in FIG. 4, the transfer initiation module 18 comprises a change of operative condition monitoring module 24 and a circuit switched bearer transfer initiation module 26. Also, the handover decision module 20 comprises a parallel handover evaluation module 28 and a parallel handover initiation module 30.

Further, in the network node 10 the different modules shown in FIG. 4 are implemented by use of the at least one processor(s) 14 in cooperation with the memory 16 to deliver the functionality according to the present invention as outlined above and as further specified in the following. It should be understood that the respective modules according to the present invention are not limited to represent separate hardware elements, but are merely illustrated as separate modules for understanding the various functionalities of the at least one processor(s) 14.

Figure 5:
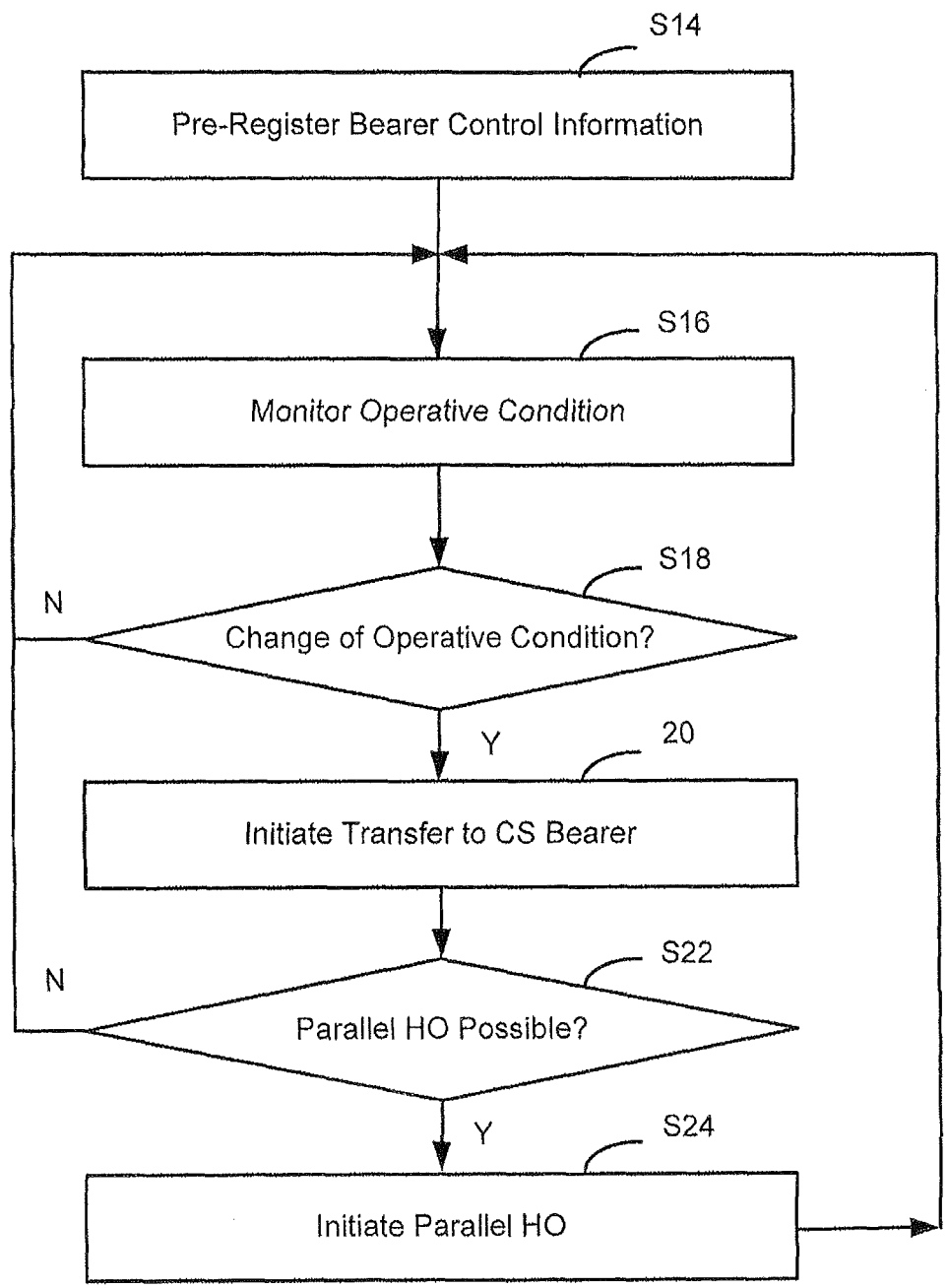
FIG. 5 shows a flowchart of operation for the radio network node having a memory being configured as shown in FIG. 4.

FIG. 5 shows a flowchart of operation for the radio network node 10 having a memory 16 being configured as shown in FIG. 4.

As shown in FIG. 5, initially there is executed a step S14 operatively being executed by the pre-registration module 22 in cooperation with the processor(s) 14, to configure the bearer control information at the radio access node 10 prior to the handling of the multiple bearers.

According to the present invention packet switched bearers—either of the first packet switched bearer or of the second packet switched bearer—may have a related allocation priority assigned thereto. Then, the step S14 of configuring the bearer control information comprises registering at least one allocation priority reserved for at least one specific type of voice service at the radio access node 10.

As shown in FIG. 5, subsequent to step S14 there follows a step S16 operatively being executed by the change of operative condition monitoring module 24 in cooperation with the processor(s) 14, to evaluate an operative condition the first packet switched bearer, e.g., whether a user is roaming within a service coverage area of the first packet switched bearer, related traffic load on the first packet switched bearer, and/or related availability.

As shown in FIG. 5, subsequent to step S16 there follows a step S18 operatively being executed by the change of operative condition monitoring module 24 in cooperation with the processor(s) 14, to evaluate whether a change in at least one operative condition the first packet switched bearer has indeed occurred.

An example for such a change of operative condition may be change of service coverage for the first packet switched bearer, e.g., crossing of service coverage border, a trigger from the core network, e.g., a trigger from a control node of the core network for terminating a circuit switched service other than a voice service, and/or a change of a traffic load on the first packet switched bearer above a predetermined threshold.

As shown in FIG. 5, subsequent to step S18 there follows a step S20 operatively being executed by the circuit switched bearer transfer initiation module 26 in cooperation with the processor(s) 14, to initiate the transfer of the voice service from the first packet switched bearer to the circuit switched bearer.

Subsequent to the transfer of the voice service the present invention also provides selectivity for the handling of further packet switched bearers in the set of multiple bearers forming the association between the user terminal and the packet switched circuit domain of the core network. Here, according to the present invention it is suggested to initiate handover for at least one further packet switched bearer only if such a handover is not critical.

However, assuming that the voice service transferred to the circuit switched bearer is a privileged voice service, e.g., a priority voice service such as a Multimedia Priority Service (MPS) or an emergency voice service, then the initiation of a parallel handover increases operational complexity and in consequence risk of failure of the complete operation. From this perspective, according to the present invention it is suggested to avoid a parallel handover of the second packet switched bearer assuming that the voice service is privileged. It is noted that the selectivity of the handling of the one or more second packet switched bearers can also be applied for conventional voice services, i.e. non-priority voice services or non-emergency voice services.

For this reason and as shown in FIG. 5, subsequent to step S20 there follows a step S22 operatively being executed by the parallel handover evaluation module 28 in cooperation with the processor(s) 14, to decide on the initiation of the handover of the at least one second packet switched bearer parallel to the transfer of the first packet switched bearer to the circuit switched bearer. The result of the decision may be either to decline the initiation of the parallel handover or to initiate the parallel handover of the at least one second packet switched bearer.

Assuming that in step S14 the bearer control information has been pre-registered in the form of the at least one allocation priority reserved for at least one specific type of voice service at the radio access node 10, then the step S22 may be realized as a comparison of an allocation priority of the first packet switched bearer with the at least one allocation priority reserved for at least one specific type of voice service as pre-registered at the radio access node 10. Then, the parallel handover is declined in step S22 upon coincidence of the allocation priority of the first packet switched bearer with the at least one allocation priority reserved for at least one specific type of voice service.

As shown in FIG. 5, subsequent to step S22 there follows a step S24 operatively being executed by the parallel handover initiation module 30 in cooperation with the processor(s) 14, to initiate a parallel handover of the at least one second packet switched bearer when the interrogation in step S22 leads to an affirmative result.

Afterwards, the operative flow may branch back to the step S16 or the operative flow may stop.

If the decision in the step S18, S22 is not in the affirmative, the operative flow may branch back to the step S16. Alternatively, the operative flow may stop.

Figure 6:
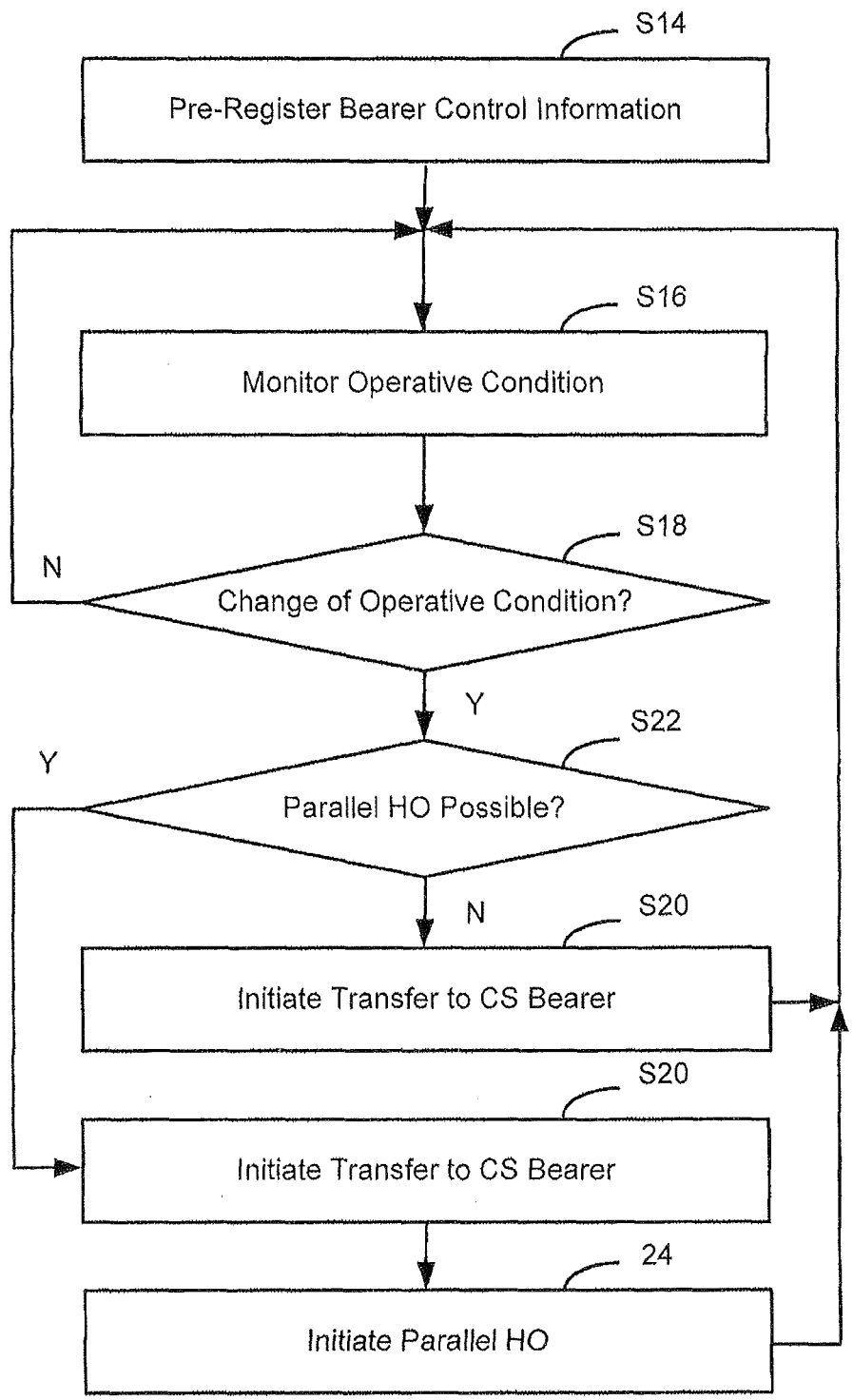
FIG. 6 shows a modified flowchart of operation for the radio network node having a memory being configured as shown in FIG. 4.

FIG. 6 shows a modified flowchart of operation for the radio network node 10 having a memory 16 being configured as shown in FIG. 4.

Basically the functionality of steps S14 to S24 with respect to FIG. 6 is the same as explained above with respect to FIG. 5.

However, FIG. 6 shows that the sequence of the operational steps S14 to S24 is not restricted to the one shown in FIG. 5 but may be varied.

As shown in FIG. 6, assuming pre-registration of bearer control information prior to handling of multiple bearers at the radio access node 10, step S14, and assuming a monitoring of the operative condition for the first packet switched bearer, step S16, then the evaluation of a change of the operative condition for the first packet switched bearer, step S18, and decision on the parallel handover of the at least one second packet switched bearer, step S22, may follow in sequence.

As shown in FIG. 6, depending on the outcome of the interrogations either step S20 to initiate transfer of the voice service to the circuit switched bearer, step S20, follows alone or in combination with the initiation of the parallel handover, step S24, prior to repetition of the monitoring of the operative condition for the first packet switched bearer in step S16.

Figure 7:
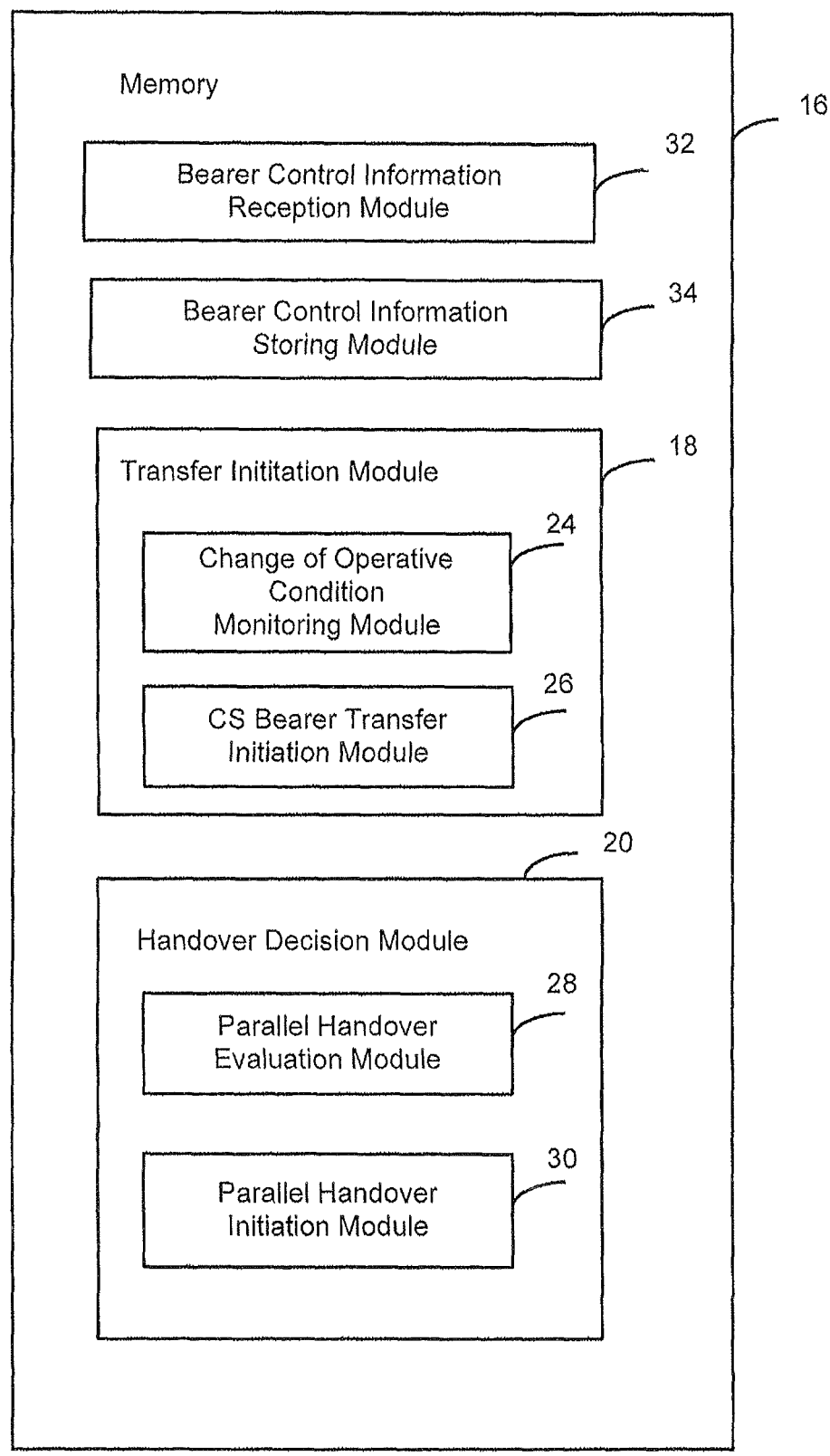
FIG. 7 shows a further schematic diagram of the memory shown in FIG. 2.

FIG. 7 shows a further schematic diagram of the memory 16 shown in FIG. 2.

As shown in FIG. 4, in addition to the transfer initiation module 18 and the handover decision module 20 explained with respect to FIG. 2, the memory 16 comprises suitably configured program code for implementing functionalities of a bearer control information reception module 32 and a bearer control information storing module 34.

As also shown in FIG. 4, the transfer initiation module 18 comprises a change of operative condition monitoring module 24 and a circuit switched bearer transfer initiation module 26. Also, the handover decision module 20 comprises a parallel handover evaluation module 28 and a parallel handover initiation module 30. The functionality of these modules is similar to those as explained above with respect to FIGS. 4 to 6 and therefor related description will not be repeated here.

Further, in the network node 10 the different modules shown in FIG. 7 are implemented by use of the at least one processor(s) 14 in cooperation with the memory 16 to deliver the functionality according to the present invention as outlined above and as further specified in the following. It should be understood that the respective modules according to the present invention are not limited to represent separate hardware elements, but are merely illustrated as separate modules for understanding the various functionalities of the at least one processor(s) 14.

Figure 8:
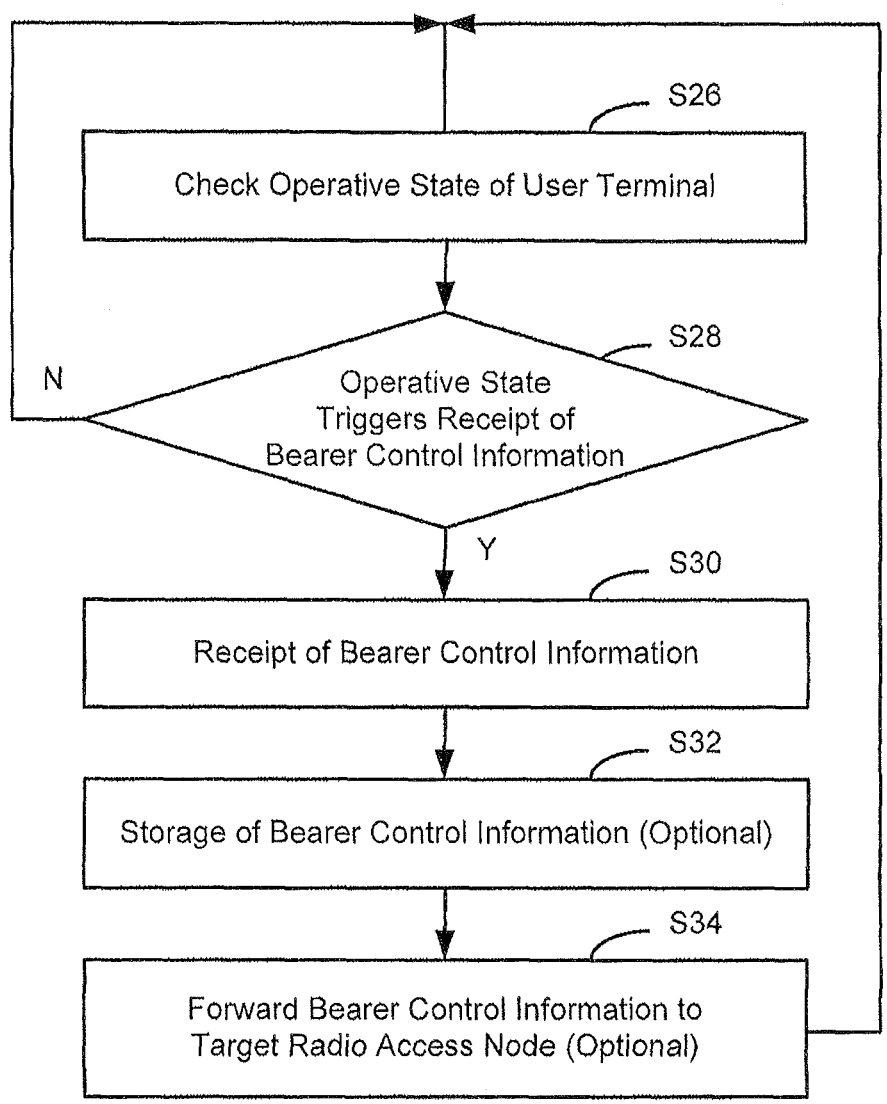
FIG. 8 shows a flowchart of operation for the bearer control information reception module and the bearer control information storing module shown in FIG. 7.

FIG. 8 shows a flowchart of operation for the bearer control information reception module 32 and the bearer control information storing module 34 shown in FIG. 7.

As shown in FIG. 8, initially there is executed a step S26 operatively being executed by the bearer control information reception module 32 in cooperation with the processor(s) 14, to check the operative state of the user terminal.

As shown in FIG. 8, then there is executed a step S28 operatively being executed by the bearer control information reception module 32 in cooperation with the processor(s) 14, to evaluate whether the operative state triggers a receipt of bearer control information at the radio access node 10 for subsequent handling of multiple bearers in the sense outlined above.

As shown in FIG. 8, if the operative state triggers the receipt of bearer control information then there follows a step S30 operatively being executed by the bearer control information reception module 32 in cooperation with the processor(s) 14, to receive, e.g., from a control node for the radio access node 10, the bearer control information as indication of the possibility of the parallel handover. Otherwise, the operative flow braches back to the monitoring of the operative state in step S26.

As shown in FIG. 8, subsequent to step S30 there may follow an optional step S32, operatively being executed by the bearer control information storage module 34 in cooperation with the processor(s) 14, to store the bearer control information for subsequent handling of multiple bearers through the radio access node 10.

As shown in FIG. 8, subsequent to step S32 there may follow an optional step S34, operatively being executed by the bearer control information reception module 32 in cooperation with the processor(s) 14, to forward the indication to a target radio access node for further handling of the voice service. Here, the step S34 of forwarding may be executed by directly forwarding the indication to the target radio access node. Alternatively the step S34 of forwarding is executed by sending the indication to the target radio access node via a control node. For example, this control node may correspond to the control node 36 for the radio access node 10 or may be a further different control node which may be involved in an associated handover of the user terminal. Subsequent to step S34, the operative flow braches back to the monitoring of the operative state in step S26. Alternatively, the operative flow may stop after step S34.

Figure 9:
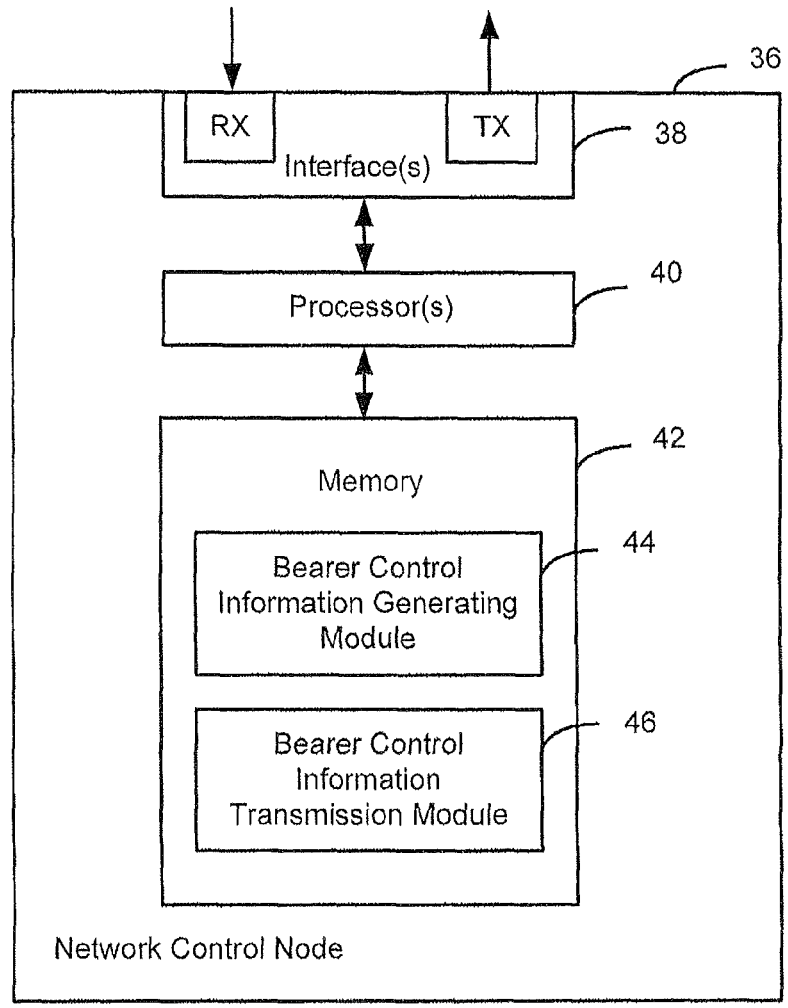
FIG. 9 shows a schematic diagram of a network control node according to the present invention.

FIG. 9 shows a schematic diagram of a network control node 36 according to the present invention.

FIG. 9 shows a network control node 36 adapted to control a network node, e.g., a radio network node handling multiple bearers as an association between a user terminal and a packet switched network domain of a core network. Again, the multiple bearers comprise a first packet switched bearer related to a voice service and at least a second packet switched bearer. It should be noted that FIG. 9 illustrates an exemplary structure which may be used for implementing the concepts underlying the present invention in a wireless network, e.g., MME or a Serving General Packet Radio Service (GPRS) Support Node (SGSN).

As shown in FIG. 9, the network control node 36 comprises at least one interface 38 to establish a transmission link. The interface 38 is suitable for information exchange, e.g., with a radio access node, e.g., the radio access node 10 explained above, in a wireless or wired way. In FIG. 9, RX represents a receiving capability of the at least one interface 38, and TX represents a sending capability of the at least one interface 38.

As shown in FIG. 9, the network control node 36 further comprises at least one processor 40 and a memory 42 comprising instructions to be executed by the at least one processor 40. The memory 42 may include a read-only memory ROM, e.g., a flash ROM, a random access memory RAM, e.g., a dynamic RAM DRAM or a static RAM SRAM, a mass storage, e.g., a hard disc or solid state disc, or the like. The memory 42 also includes instructions, for example suitably configured program code to be executed by the processor(s) 40 in order to implement a later described functionality of the network control node 36. This functionality will be referred to in the following as modules. It is noted that these modules do not represent individual hardware elements of the network control node 36, but rather represent functionalities generated when the one or more processors 40 execute the suitably configured program code.

As shown in FIG. 9, the memory 42 may include suitably configured program code to implement a bearer control information generating module 44 and a bearer control information transmission module 46. Further, the suitably configured program code in the memory 42 may also implement a control module for implementing various control functionalities, e.g., for controlling the network control node 36 so as to establish and/or maintain radio or wired links, or the like.

Figure 10:
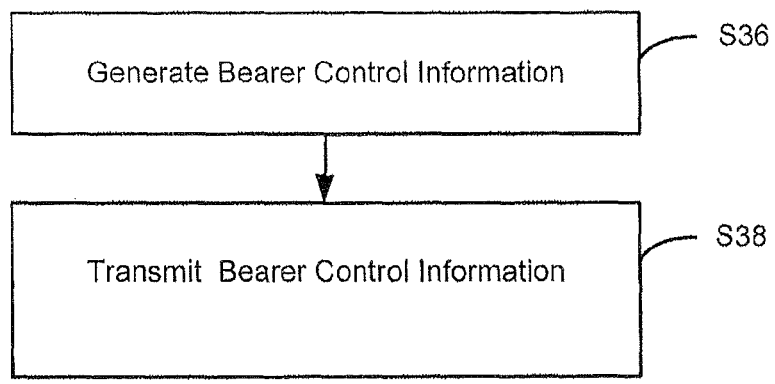
FIG. 10 shows a flowchart of operation for the network control node shown in FIG. 9.

FIG. 10 shows a flowchart of operation for the network control node shown in FIG. 9.

As shown in FIG. 10, initially there is executed a step S36 operatively being executed by the bearer control information generating module 44 to generate bearer control information indicating a possibility for a handover of at least one second packet switched bearer from a first packet switched access to a second packet switched access.

According to the present invention the possibility is expressed under the condition that a transfer of the voice service is initiated from the first packet switched bearer to a circuit switched bearer upon change of an operative condition for the first packet switched bearer. As outlined above, the change of the operative condition for the first packet switched bearer may be a change of service coverage for the first packet switched bearer occurs, a trigger from the core network, and/or a change of the traffic load on the first packet switched bearer above a predetermined threshold.

As shown in FIG. 10, initially there is executed a step S38 operatively being executed by the bearer control information transmission module 46 to transmit the generated bearer control information to the network node, e.g., the radio access node 10. According to the present invention such transfer may be initiated
when the user terminal changes from an idle mode to a connected mode;
when the user terminal is in a connected mode;
in response to a service request received from the user terminal; and/or
with respect to an established packet switched bearer.

In order to transmit the generated bearer control information to the radio access node, the bearer control information can be included in an Initial Context setup message, e.g., if the user terminal changes from the idle mode to the connected mode and a Packet Data Network (PDN) connection may be or might not be existing for a privileged voice service explained above. The bearer control information can alternatively be included in a Bearer Setup message, e.g., if the user terminal is in the connected mode and a new PDN connection may be to be set up for a privileged voice service explained above. Further, the bearer control information can be included in a new type of message. In the first and second options, the respective message may include a new information element to carry the indication.

Further to the above, it should be understood that the present invention is also related to a communication system adapted to control multiple bearers as an association between a user terminal and a packet switched network domain of a core network. The multiple bearers comprise a first packet switched bearer related to a voice service and at least one second packet switched bearer. The communication system comprising a radio access node 10 according to the present invention as explained above with respect to FIGS. 2 to 8 and a network control node according to the present invention as explained above with respect to FIGS. 9 and 10.

Figure 11A:
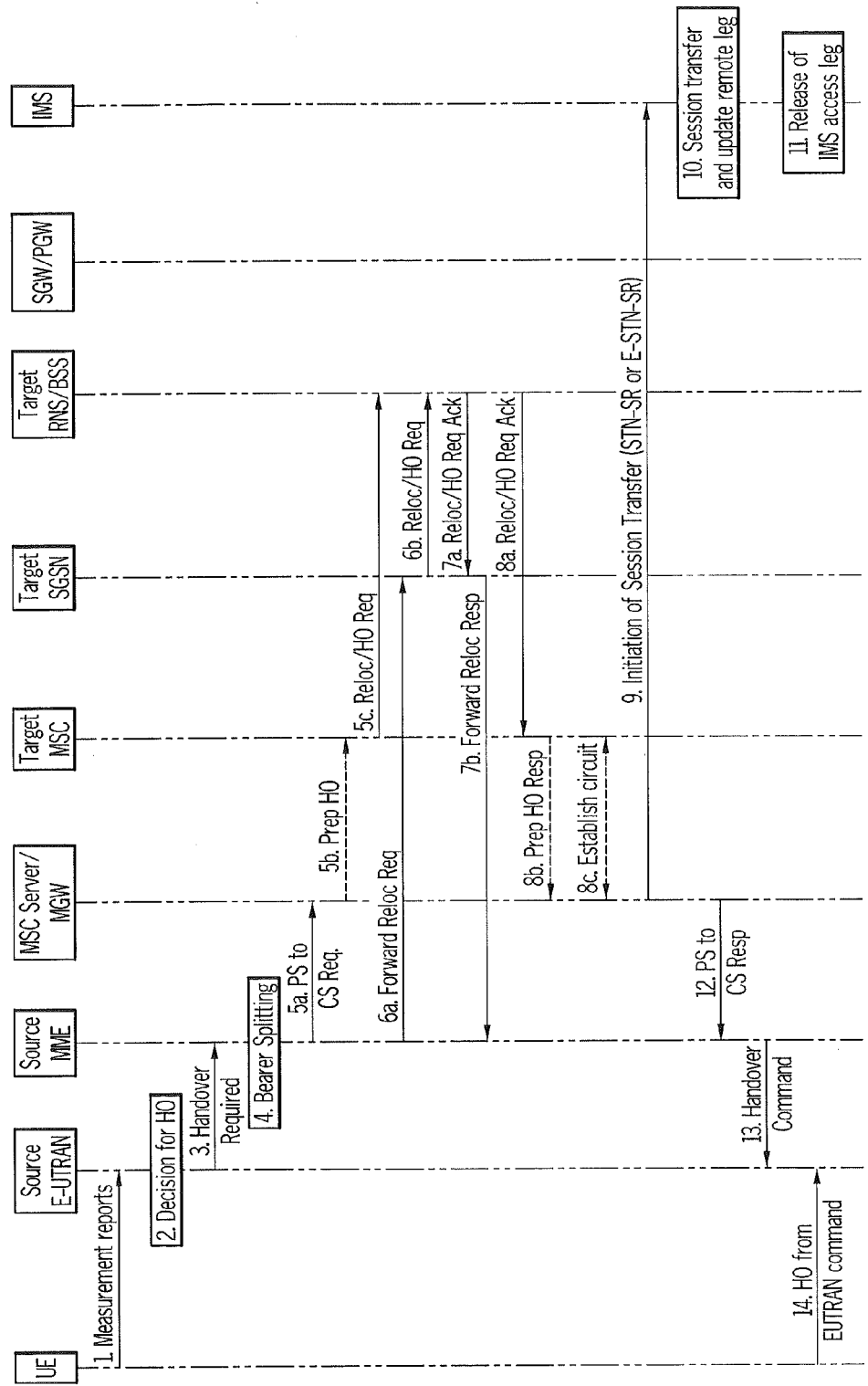
FIGS. 11a, 11b show an example of application of the present invention to a mobile communication environment.
Figure 11B:
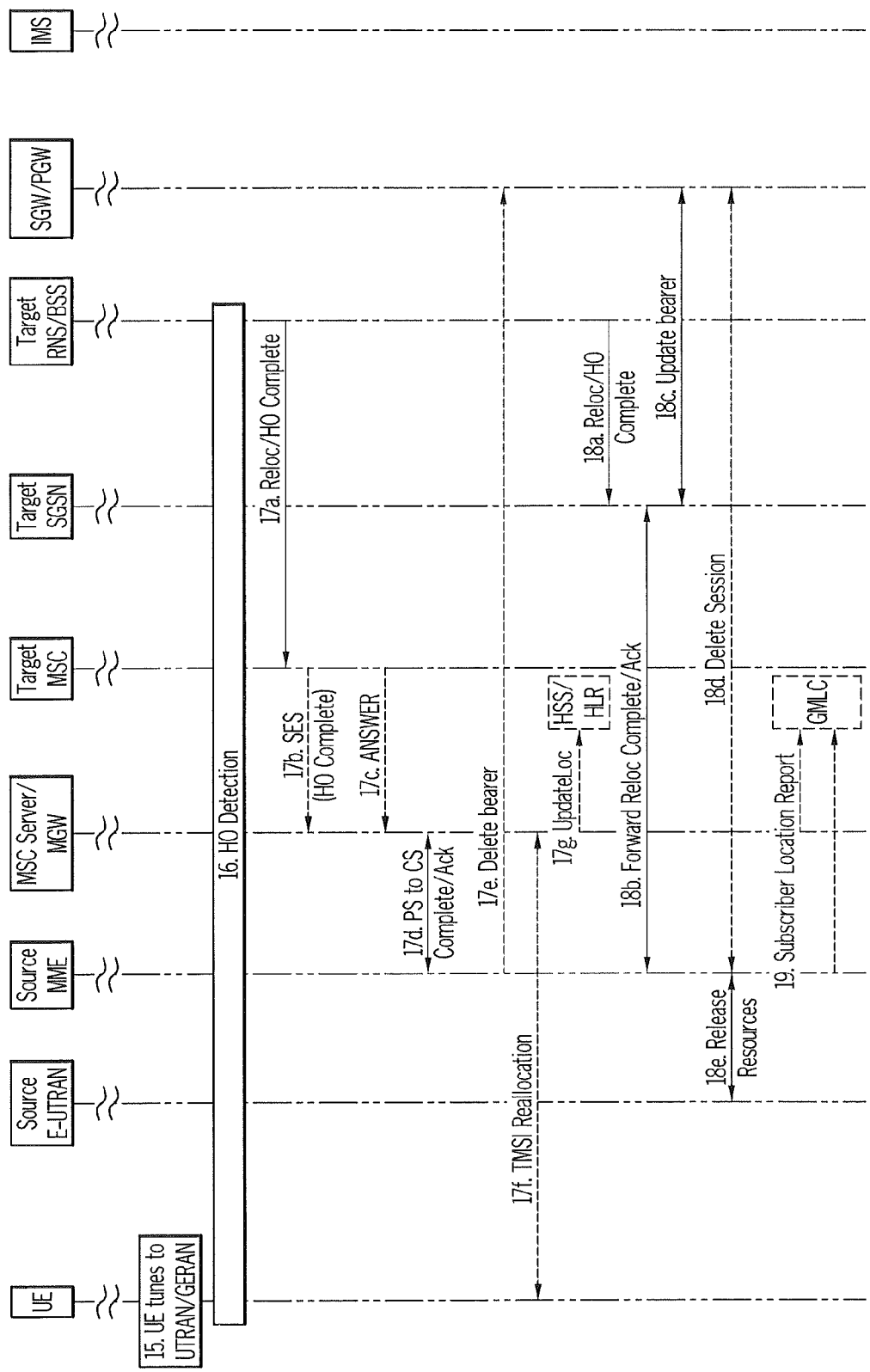

FIGS. 11a, 11b show an example of application of the present invention to a mobile communication environment. The signaling flow illustrated in FIGS. 11a, 11b is defined in accordance with Third Partnership Project (3GPP) Technical Specification (TS) 23.216 V11.9.0 (2013-06). A user terminal in the form of a user equipment UE is handed over from a source LTE access network, also known as Evolved-UMTS Terrestrial Radio Access Network (UTRAN) (E-UTRAN), to a target UTRAN or target GSM EDGE Radio Access Network (GERAN) access network both offering the user terminal circuit switched and packet switched communication functionality. A control node for the source radio access network is a source MME, and a radio access node of the source radio access network is an eNodeB referred to in the following as eNB (not shown). A control node of a circuit switched domain of a target core network is an MSC in the target network, and a control node of a packet switched domain of the target core network is a target SGSN. A target radio access node of UTRAN controllable by the control node of the circuit switched domain of the target network and the target SGSN is a Radio Network Controller (RNC), while a target radio access node of GERAN controllable by the control node of the circuit switched domain of the target network and the target SGSN is a Base Station Controller (BSC) of a Base Station Subsystem (BSS) of the target GERAN. The SGSN and the MME are connectable with a Signaling Gateway (SGW) and a PDN Gateway (PGW) to an IMS domain. A Media Gateway (MGW) is also located in the circuit switched domain of the target core network.

As is explained in the following, a transfer of the voice service from a packet switched bearer via the LTE radio access network to a circuit switched bearer via the target radio access network by means of SRVCC is performed from the source E-UTRAN to the target UTRAN with a parallel packet switched handover (PS HO) or to GERAN with Dual Transfer Mode (DTM) Handover (HO) support, which enables voice and media voice services to be handled simultaneously. In other words, the transfer of the voice service described above with respect to FIGS. 1 to 10 may correspond to SRVCC, and the parallel handover of at least a second packet switched bearer described above with respect to FIGS. 1 to 10 may relate to the PS HO and the DTM HO.
1. UE sends measurement reports to E-UTRAN,
2. Based on UE measurement reports the source E-UTRAN decides to trigger an SRVCC handover to UTRAN/GERAN.
3. Previously, in the existing solution if target is UTRAN, the source E-UTRAN sends a Handover Required (Target ID, generic Source to Target Transparent Container, SRVCC HO indication) message to the source MME. SRVCC HO indication indicates to MME that this is for CS+PS HO.
   NOTE 1: When the source E-UTRAN indicates using SRVCC HO Indication that target is both CS and PS capable and this is a CS+PS HO request, the source MME sends the single received transparent container to both the target CS domain and the target PS domain.
   If target is GERAN, the source E-UTRAN sends a Handover Required (Target ID, generic Source to Target Transparent Container, additional Source to Target Transparent Container, SRVCC HO Indication) message to the source MME. The E-UTRAN places the "old BSS to new BSS information IE" for the CS domain in the additional Source to. Target Transparent Container. In this respect, IE denotes an Information Element. The differentiation between CS and PS containers is described in TS 36.413 V11.5.5 (2013-09). In this case, the MME identifies from SRVCC HO Indication that this is a request for a CS+PS handover.
   However, there are the following problems with the existing solution:
   In case the eNB initiates SRVCC for an IMS emergency call, it is possible that also PSHO will be initiated according to TS 23.216 V11.9.0 (2013-06). This will be done if both UE and network support PSHO.
   In existing solutions the eNB cannot differentiate between a priority call and an emergency call. Moreover, it is specified in TS 23.216 V11.9.0 (2013-06) that "The E-UTRAN initiates the SRVCC procedure as specified for regular Voice over IMS session. The MME is aware that this is an emergency session and sends an indication to the MSC Server enhanced for SRVCC."
   However, as outlined above performing both SRVCC and PSHO increases the likelihood of errors compared to doing SRVCC without PSHO, and hence it might be an operator or even regulatory requirement to not perform PS HO in case of emergency SRVCC. Reasons for increased likelihood of failure at PSHO are for example that the PSHO procedures are complex, with many signals between many nodes, and if any signal fails the whole procedure will usually fail.
   In other words, it is not possible for the MME to only perform SRVCC and not the PS HO, because the eNB has prepared the transparent container that is sent to the target RAN, and the target radio access network RAN would expect to be contacted by both MSC and SGSN. In case of Wideband (WCDMA), the RNC waits for two Iu Signalling Connections, one by the MSC and one by the SGSN, and if only the one by the MSC would be detected, the whole handover including the emergency call would fail.
   The eNB is configured with the Allocation Retention Priority (ARP) range to treat as prioritised call, but it does not differ between MPS and emergency call, and has no special handling for emergency calls in existing solutions.

The same type of problem can occur also for SRVCC from UTRAN (High Speed Packet Access (HSPA)) to GERAN/UTRAN, since PSHO also is an option in this case, and IMS Emergency call can be supported also in UTRAN.

In view of the problems outlined above, the basic concept of the present invention is described in the following for SRVCC with respect to emergency calls. However, the principle is also applicable for priority services such as calls associated with a certain MPS priority level.

Further, as outlined above the basic concept of the present invention provides two solutions, wherein the second solution can be re-used also for SRVCC for normal calls, i.e. non-emergency calls and non-MPS calls, since it is the MME that can decide when to allow/not allow PSHO together with SRVCC.

The concept is also applicable for SRVCC from UTRAN (HSPA) to GERAN/UTRAN, where it would be the SGSN instead of the MME that sends an indication such as "SRVCC with PS HO possible" or "SRVCC with PS HO is not possible" to the RNC instead of the eNB, and other aspects in relation to the invention are also similar. The RNC receiving the indication may forward the indication to a further RNC, optionally via one or more SGSN.

The first solution according to the present invention is, as already outlined above, as follows:

The eNB is enhanced to differ between emergency calls and other priority calls by configuration, i.e., by configuring on the eNB which ARP values are used for emergency call and in particular for which of those only SRVCC and not PSHO should be initiated. The MME is only one of the nodes involved in setting ARP, primarily Home Subscriber Server (HSS) and Policy and Charging Rules Function (PCRF) are setting ARP. But since IMS Emergency call is not a subscribed service, values such as ARP are configured into the MME and not provided by HSS. The MME shall supervise that the ARP value for any traffic on the Emergency Access Point Name (APN) is set to the correct value. It is possible to have different ARP for the default bearer and the Quality of Service (QoS) Class Identifier (QCI1) bearer. By this it can be achieved that eNB never initiate SRVCC with PSHO if the ARP value is the one used for IMS Emergency calls.

In view of this, the step 3 as explained above is revised as follows:

If target is UTRAN, the source E-UTRAN sends a Handover Required (Target ID, generic Source to Target Transparent Container, SRVCC HO indication) message to the source MME. Based on configuration, and if the Source E-UTRAN determines that this SRVCC is for CS+PS HO, the SRVCC HO indication indicates to MME that this is for CS+PS HO. Based on configuration, the Source E-UTRAN may determine that PS HO shall not be performed, e.g., because of ARP value, and then the SRVCC HO indication indicates to MME that target is only CS capable and proceeds with step 2 in section 6.2.2.1 of TS23.216 V11.9.0 (2013-06).

NOTE 1: When the source E-UTRAN indicates using SRVCC HO Indication that target access network is both CS and PS capable and this is a CS+PS HO request, the source MME sends the single received transparent container to both the target CS domain and the target PS domain.

If target is GERAN, the source E-UTRAN sends a Handover Required (Target ID, generic Source to Target Transparent Container, additional Source to Target Transparent Container, SRVCC HO Indication) message to the source MME. The E-UTRAN places the "old BSS to new BSS information IE" for the CS domain in the additional Source to Target Transparent Container. The differentiation between CS and PS containers is described in TS 36.413 V11.5.0 (2013-09). In this case, the MME identifies from SRVCC HO Indication that this is a request for a CS+PS handover.

Further, the second solution according to the present invention is, as already outlined above, as follows:

The MME need to indicate to the eNB to initiate or to not initiate PSHO in case of SRVCC, e.g., by indicating "SRVCC with PS HO possible" or "SRVCC with PS HO not possible", respectively, in the Initial Context Setup Request to the eNB for a UE. Alternatively, an indication is provided in the bearer setup message E-RAB Setup Request.

In view of this, the step as explained above is alternatively revised as follows:

The existing behaviour is that the eNB does not keep any information about a UE while the UE is in Idle state, instead the MME will download information about the UE to the eNB in Initial Context Setup message each time the UE goes to connected state, which is made typically by a Service Request from the UE to the MME, e.g., via the eNB. In the Initial Context Setup Request from MME to eNB, the MME will set or not set the parameter "SRVCC operation possible". The new solution is to add a parameter like "SRVCC with PS HO possible" or that "SRVCC with PS HO is not possible". The MME can either set this parameter for each Service Request, or to only set it in case the UE has a PDN connection for IMS emergency:

Note that at eNB change/cell change this new parameter needs to be forwarded between the eNBs to assure that the new eNB has access to the parameter, in case no new Service Request etc. is performed in the new cell. The handling of this new parameter is equivalent to the existing handling in TS 36.423 V11.6.0 (2013-09) of the parameter "SRVCC operation possible".

In conclusion, the following changes are added to the above call flow step 3 for SRVCC:

If target is UTRAN, the source E-UTRAN sends a Handover Required (Target ID, generic Source to Target Transparent Container, SRVCC HO indication) message to the source MME. Based on indication by the MME indicating that "SRVCC with PS HO possible", and if the Source E-UTRAN determines that this SRVCC is for CS+PS HO, the SRVCC HO indication indicates to MME that this is for CS+PS HO. Based on indication by the MME indicating that "SRVCC with PS HO not possible", the SRVCC HO indication indicates to MME that target is only CS capable and proceeds with step 2 in section 6.2.2.1 of TS 36.413 V11.5.0 (2013-09).

NOTE 2: When the source E-UTRAN indicates using SRVCC HO Indication that target is both CS and PS capable and this is a CS+PS HO request, the source MME sends the single received transparent container to both the target CS domain and the target PS domain.

If target is GERAN, the source E-UTRAN sends a Handover Required (Target ID, generic Source to Target Transparent Container, additional Source to Target Transparent Container, SRVCC HO Indication) message to the source MME. The E-UTRAN places the "old BSS to new BSS information IE" for the CS domain in the additional Source to Target Transparent Container. The differentiation between CS and PS containers is described in TS 36.413 V11.5.0 (2013-09). In this case, the MME identifies from SRVCC HO Indication that this is a request for a CS+PS handover.

4. Based on the QCI associated with the voice bearer (QCI=1) and the SRVCC HO Indication, the source MME splits the voice bearer from all other PS bearers and initiates their relocation towards MSC Server and SGSN, respectively.

5a) Source MME initiates the PS-CS handover procedure for the voice bearer by sending a SRVCC PS to CS Request (IMSI, Target ID, STN-SR, C-MSISDN, Source to Target Transparent, Container, MM Context, Emergency Indication) message to the MSC Server. If SRVCC with priority is supported, the MME also includes priority indication in SRVCC PS to CS Request if it detects the SRVCC requires priority handling. The detection is based on the ARP associated with the EPS bearer used for IMS signalling. The priority indication corresponds to the ARP information element. The Emergency Indication and the equipment identifier are included if the ongoing session is emergency session. Authenticated International Mobile Subscriber Identity (IMSI) and Correlation Mobile Station Integrated Services Digital Network (ISDN) number C-MSISDN shall also be included if available. The message includes information relevant to the CS domain only. MME received Session Transfer Number for SRVCC (STN-SR) and C-MSISDN from the HSS as part of the subscription profile downloaded during the E-UTRAN attach procedure. Mobility Management (MM) Context contains security related information. CS security key is derived by the MME from the E-UTRAN/Evolved Packet System (EPS) domain key as defined in TS 33.401 V11.7.0 (2013-06). The CS Security key is sent in the MM Context.

5b) MSC Server interworks the PS-CS handover request with a CS inter-MSC handover request by sending a Prepare Handover Request message to the target MSC. If SRVCC with priority is supported and the MSC Server receives the priority indication (i.e. ARP) in the SRVCC PS to CS Request, the MSC server/MGW sends Prepare Handover Request message to the Target MSC with priority indication mapped from the ARP. The MSC Server maps the ARP to the priority level, preemption capability/vulnerability for CS services based on local regulation or operator settings. The priority indication indicates the CS call priority during handover as specified in TS 25.413 V11.4.0 (2013-06) for UMTS and TS 48.008 V11.6.0 (2013-06) for GSM/Enhanced data rates for GSM evolution (EDGE). If the target system is GERAN, the MSC Server assigns a default Service Area Identifier (SAI) as Source ID on the interface to the target BSS and uses BSS Mobile Application Part (BSSMAP) encapsulated for the Prepare Handover Request. If the target system is UTRAN, the MSC Server uses Radio Access Network Application Part (RANAP) encapsulated for the Prepare Handover Request.

NOTE 3: The value of the default SAI is configured in the MSC and allows a Release 8 and later BSC to identify that the source for the SRVCC Handover is E-UTRAN. To ensure correct statistics in the target BSS the default SAI should be different from the SAIs used in UTRAN.

5c) Target MSC requests resource allocation for the CS relocation by sending the Relocation Request/Handover Request message to the target Radio Network Subsystem (RNS)/BSS. If the MSC Server indicates priority, the RNC/BSS allocates the radio resource based on the existing procedures with priority indication, as specified in TS 23.009 V11.2.0 (2012-12) and in TS 25.413 V11.4.0 (2013-06) for UMTS and TS 48.008 V11.6.0 (2013-09) for GSM/EDGE. If the target Radio Access Technology (RAT) is UTRAN, Relocation Request/Handover Request message contains the generic Source to Target Transparent Container. If the target RAT is GERAN, Relocation Request/Handover Request message contains the additional Source to Target Transparent Container.
6. In parallel to the previous step the source MME initiates relocation of the PS bearers. The following steps are performed, for details see TS 23.401 V11.7.0 (2013-09), clauses 5.5.2.1 and 5.5.2.3:
   a) Source MME sends a Forward Relocation Request (generic Source to Target Transparent Container, MM Context, PDN Connections IE) message to the target SGSN. If the target SGSN uses S4 based interaction with S-GW and P-GW, the PDN Connections IE includes bearer information for all bearers except the voice bearer. The handling of security keys for PS handover of the remaining non-voice PS bearers is specified in TS 33.401 V11.7.0 (2013-06).
   NOTE 4: If the target SGSN uses Gn/Gp based interaction with Gateway GPRS Support Node (GGSN) the Forward Relocation Request will contain PDP Contexts, instead of PDN Connections IE, including bearer information for all bearers except the voice bearer.
   b) Target SGSN requests resource allocation for the PS relocation by sending the Relocation Request/Handover Request (Source to Target Transparent Container) message to the target RNS/BSS.
7. After the target RNS/BSS receives both the CS relocation/handover request with the PS relocation/handover request, it assigns the appropriate CS and PS resources. The following steps are performed:
   a) Target RNS/BSS acknowledges the prepared PS relocation/handover by sending the Relocation Request Acknowledge/Handover Request Acknowledge (Target to Source Transparent Container) message to the target SGSN.
   b) Target SGSN sends a Forward Relocation Response (Target to Source Transparent Container) message to the source MME.
8. In parallel to the previous step the following steps are performed:
   a) Target RNS/BSS acknowledges the prepared CS relocation/handover by sending the Relocation Request Acknowledge/Handover Request Acknowledge (Target to Source Transparent Container) message to the target MSC.
   b) Target MSC sends a Prepare Handover Response (Target to Source Transparent Container) message to the MSC Server.
   c) Establishment of circuit connection between the target MSC and the MGW associated with the MSC Server e.g. using ISDN User Part (ISUP) Initial Address Message (IAM) and Address Complete Message (ACM) messages.
   NOTE 5: The Target to Source Transparent Container sent to the target SGSN is step 7a and the Target to Source Transparent Container sent to the target MSC in step 8a, include the same allocation of CS and PS resources (e.g. the target BSS includes the same DTM Handover Command in both containers).
9. For non-emergency session, the MSC Server initiates the Session Transfer by using the STN-SR e.g. by sending an ISUP IAM (STN-SR) message towards the IMS. If this is a priority session, the MSC Server sends the SIP Session Transfer message with the priority indication to the IMS and the IMS entity handles the session transfer procedure with priority. The priority indication in the SIP Session Transfer message is mapped by the MSC Server from the priority indication (i.e. ARP) in the SRVCC PS to CS Request received in step 5. The mapping of the priority level is based on operator policy and/or local configuration, and the IMS priority indicator should be the same as for the original IMS created over PS. For emergency session, the MSC Server initiates the Session Transfer by using the locally configured E-STN-SR and by including the equipment identifier. IMS Service Continuity or Emergency IMS Service Continuity procedures are applied for execution of the Session Transfer, TS 23.237 V11.9.0 (2013-09).
   NOTE 6: This step can be started after step 8b.
   NOTE 7: If the MSC Server is using an ISUP interface, then the initiation of the session transfer for non-emergency sessions may fail if the subscriber profile including Customized Applications for Mobile Network Enhanced Logic (CAMEL) triggers is not available prior handover (see clause 7.3.2.1.3 of TS 23.292 V11.6.0 (2013-06), and can also fail if CAMEL triggers are available and local anchor transfer function is used (see TS 23.237 V11.9.0 (2013-09). If the subscriber profile is available prior handover then CAMEL triggers others than those used in clause 7.3.2.1.3 of TS 23.292 V11.6.0 (2013-06) are not used during the transfer.
10. During the execution of the Session Transfer procedure the remote end is updated with the SDP of the CS access leg according to TS 23.237 V11.9.0 (2013-09). The downlink flow of VoIP packets is switched towards the CS access leg at this point.
11. The source IMS access leg is released according to TS 23.237 V11.9.0 (2013-09).
    NOTE 8: Steps 10 and 11 are independent of step 12.
12. The MSC Server sends a SRVCC PS to CS Response (Target to Source Transparent Container) message to the source MME.
13. Source MME synchronises the two prepared relocations and sends a Handover Command (Target to Source Transparent Container) message to the source E-UTRAN.
    NOTE 9: When the target cell is GERAN, the MME may receive different Target to Source Transparent Containers from the MSC Server and from the SGSN, i.e. a "New BSS to Old BSS Information" (see TS 48.008 V11.6.0 (2013-09) may be received from the MSC Server and a "Target BSS to Source BSS Transparent Container" (see TS 48.018 V11.4.0 (2013-09)) may be received from the SGSN.
14. E-UTRAN sends a Handover from E-UTRAN Command message to the UE.
15. UE tunes to the target UTRAN/GERAN cell.
16. Handover Detection at the target RNS/BSS occurs. The UE sends a Handover Complete message via the target RNS/BSS to the target MSC. If the target MSC is not the MSC Server, then the Target MSC sends an SES (Handover Complete) message to the MSC Server. At this stage, the UE re-establishes the connection with the network and can send/receive voice data.
17. The CS relocation/handover is complete. The following steps are performed:
    a) Target RNS/BSS sends Relocation Complete/Handover Complete message to the target MSC.

b) Target MSC sends a Send End Signal (SES) (Handover Complete) message to the MSC Server. The speech circuit is through connected in the MSC Server/MGW according to TS 23.009 V11.2.0 (2012-12).

c) Completion of the establishment procedure with ISUP Answer message to the MSC Server according to TS 23.009 V11.2.0 (2012-12).

d) MSC Server sends a SRVCC PS to CS Complete Notification message to the source MME. Source MME acknowledges the information by sending a SRVCC PS to CS Complete Acknowledge message to the MSC Server.

e) The source MME deactivates the voice bearer towards S-GW/P-GW and sets the PS-to-CS handover indicator to Delete Bearer Command message. This triggers MME-initiated Dedicated Bearer Deactivation procedure as specified in TS 23.401 V11.7.0 (2013-09). The MME does not send deactivation request toward the eNodeB on receiving PS-to-CS Complete Notification in step 17d. If dynamic Policy and Charging Control (PCC) is deployed, the PGW may interact with PCRF as defined in TS 23.203 V11.11.0 (2013-09).

f) If the Home Location Register (HLR) is to be updated, i.e. if the IMSI is authenticated but unknown in the Visitor Location Register (VLR), the MSC Server performs a Temporary Mobile Subscriber Identity (TMSI) reallocation towards the UE using its own non-broadcast Location Area Identifier (LAI) and, if the MSC Server and other MSC/VLRs serve the same (target) LAI, with its own Network Resource Identifier (NRI).

NOTE 10: The TMSI reallocation is performed by the MSC Server towards the UE via target MSC.

g) If the MSC Server performed a TMSI reallocation in step 17f, and if this TMSI reallocation was completed successfully, the MSC Server performs a MAP Update Location to the HSS/HLR.

NOTE 11: This Update Location is not initiated by the UE.

18. In parallel to the previous step, the PS relocation/handover is completed. The following steps are performed:

a) Target RNS/BSS sends Relocation Complete/Handover Complete message to target SGSN.

b) Target SGSN sends a Forward Relocation Complete message to the source MME. After having completed step 17e, the source MME acknowledges the information by sending a Forward Relocation Complete Acknowledge message to the target SGSN.

c) Target SGSN updates the bearer with S-GW/P-GW/GGSN as specified in TS 23.401 V11.7.0 (2013-09).

d) The MME sends Delete Session Request to the SGW as defined in TS 23.401 V11.7.0 (2013-09).

e) The source MME sends a Release Resources message to the Source eNodeB as defined in TS 23.401 V11.7.0 (2013-09). The Source eNodeB releases its resources related to the UE and responds back to the MME.

NOTE 12: Routing Area Update procedures by the UE are done in accordance with TS 23.401 V11.7.0 (2013-09).

19. For an emergency services session after handover is complete, the source MME or the MSC Server may send a Subscriber Location Report carrying the identity of the MSC Server to a Gateway Mobile Location Center (GMLC) associated with the source or target side, respectively, as defined in TS 23.271 V11.2.0 (2013-03) to support location continuity.

NOTE 13: Any configuration of the choice between a source MME versus MSC Server update to a GMLC needs to ensure that a single update occurs from one of these entities when the control plane location solution is used on the source and/or target sides.

In case the MME determines that only the relocation of the voice bearer but not the relocation of one or more PS bearers succeeds, then the MME proceeds with step 13 after receiving SRVCC PS to CS Response from the MSC Server in step 12 and both UE and MME continue the procedure as described in clause 6.2.2.1A of TS 23.216 V11.9.0 (2013-06).

It should be noted that there is equivalent logic for SRVCC from UTRAN (HSPA) to 3GPP GERAN/UTRAN, which is also described in 3GPP TS 23.216 V11.9.0 (2013-06).

It is noted that the concepts according to the invention can be also implemented in a wireless or wired communication network, wherein one or more functionalities of the network node 10 may be realized by different network nodes of the communication system, for example access network nodes or core network nodes, and/or network entities connectable to the communication network, for example terminals. Further, associated information exchange may be provided between the involved nodes and/or entities in order to provide the respective node or entity implementing a certain functionality with required input information.

Further to the above, according to another example of the present invention there is provided a computer program product directly loadable into the memory, particularly the internal memory of the processor, of the network node comprising software code portions for performing the inventive process when the product is run on the processor of the network node.

Therefore, the present invention is also provided to achieve an implementation of the inventive method steps on computer or processor systems. In conclusion, such implementation leads to the provision of computer program products for use with a computer system or more specifically a processor comprised in e.g., the network node.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and hard disk drives; or information convey to a computer/processor through communication media such as network and/or telephone networks via modems or other interface devices. It should be understood that such media, when carrying processor readable instructions implementing the inventive concept represent alternate examples of the present invention.

While in the above, the present invention has been described with reference to the drawings and figures, it should be noted that clearly the present invention may also be implemented using variations and modifications thereof which will be apparent and can be readily made by those skilled in the art without departing from the scope and spirit of the present invention. E.g., functionalities described above may be realized in software, in hardware, or a combination thereof.

Accordingly, it is not intended that the scope of claims appended hereto is limited to the description as set forth herein, but rather that the claims should be construed so as to encompass all features of presentable novelty that preside in the present invention, including all features that would be treated as equivalent thereof by those skilled in the art to which the present invention pertains.

The invention claimed is:

1. A method of operating a radio access node that handles multiple bearers as an association between a user terminal and a packet switched network domain of a core network, wherein the multiple bearers comprise a first packet switched bearer related to a voice service and at least one second packet switched bearer, the method comprising:
 configuring bearer control information by registering, at the radio access node, at least one allocation priority reserved for at least one specific type of voice service for the first packet switched bearer or the second packet switched bearer;
 initiating a transfer of the voice service from the first packet switched bearer to a circuit switched bearer upon change of an operative condition for the first packet switched bearer; and
 selectively initiating a handover of the at least one second packet switched bearer, concurrent in time with the transfer of the voice service, from a first packet switched access to a second packet switched access based on the bearer control information indicating possibility of a parallel handover,
 wherein the selectively initiating the handover comprises:
  comparing an allocation priority of the first packet switched bearer with the at least one allocation priority reserved for at least one specific type of voice service; and
  declining the parallel handover upon coincidence of the allocation priority of the first packet switched bearer with the at least one allocation priority reserved for at least one specific type of voice service.

2. The method according to claim 1, wherein the change of the operative condition for the first packet switched bearer is a change of service coverage for the first packet switched bearer, a trigger from the core network, or a change of a traffic load on the first packet switched bearer above a predetermined threshold.

3. The method according to claim 1, wherein the selectively initiating a handover for the at least one second packet switched bearer comprises declining the initiation of the handover or affirming the initiation of the handover.

4. The method according to claim 1, further comprising configuring the bearer control information at the radio access node prior to the handling of the multiple bearers.

5. The method according to claim 1, further comprising receiving, from a control node for the radio access node, the bearer control information as indication of the possibility of the parallel handover.

6. The method according to claim 5, wherein the indication is received when the user terminal changes from an idle mode to a connected mode.

7. The method according to claim 5, wherein the indication is received when the user terminal is in a connected mode.

8. The method according to claim 5, wherein the indication is received in response to a service request from the user terminal.

9. The method according to claim 5 wherein the indication is received with respect to an established packet switched bearer.

10. The method according to claim 5, further comprising storing the bearer control information for subsequent handling of multiple bearers through the radio access node.

11. The method according to claim 1, further comprising forwarding the indication to a target radio access node for further handling of the voice service.

12. The method according to claim 11, wherein the forwarding is executed by directly forwarding the indication to the target radio access node.

13. The method according to claim 11, wherein the forwarding is executed by sending the indication to the target radio access node via a control node for the radio access node.

14. The method according to claim 1, wherein the parallel handover is not initiated when the voice service is a priority voice service or an emergency voice service.

15. A radio access node that handles multiple bearers as an association between a user terminal and a packet switched network domain of a core network, wherein the multiple bearers comprise a first packet switched bearer related to a voice service and at least a second packet switched bearer, the radio access node comprising:
 at least one interface to establish a transmission link,
 at least one processor, and
 a memory comprising instructions executed by the at least one processor to perform operations comprising:
  configuring bearer control information by registering, at the radio access node, at least one allocation priority reserved for at least one specific type of voice service for the first packet switched bearer or the second packet switched bearer;
  initiating a transfer of the voice service from the first packet switched bearer to a circuit switched bearer upon change of an operative condition for the first packet switched bearer; and
  selectively initiating a handover of the at least one second packet switched bearer, concurrent in time with the transfer of the voice service, from a first packet switched access to a second packet switched access based on the bearer control information indicating possibility of a parallel handover,
  wherein the selectively initiating the handover comprises:
   comparing an allocation priority of the first packet switched bearer with the at least one allocation priority reserved for at least one specific type of voice service; and
   declining the parallel handover upon coincidence of the allocation priority of the first packet switched bearer with the at least one allocation priority reserved for at least one specific type of voice service.

16. The radio access node according to claim 15, wherein the change of the operative condition for the first packet switched bearer is a change of service coverage for the first packet switched bearer, a trigger from the core network, or a change of a traffic load on the first packet switched bearer above a predetermined threshold.

17. A method of operating a network control node that controls a radio access node handling multiple bearers as an association between a user terminal and a packet switched network domain of a core network, wherein the multiple bearers comprise a first packet switched bearer related to a voice service and at least one second packet switched bearer, the method comprising:
 generating bearer control information indicating a possibility for a handover of at least one second packet switched bearer from a first packet switched access to a second packet switched access, the possibility being expressed under condition that a transfer of the voice service is initiated from the first packet switched bearer to a circuit switched bearer upon change of an operative condition for the first packet switched bearer; and transmitting the bearer control information to the radio access node for selectively initiating the handover in response to comparing an allocation priority of the first packet switched bearer with at least one allocation priority reserved for at least one specific type of voice service, and declining the handover upon coincidence of the allocation priority of the first packet switched bearer with the at least one allocation priority reserved for at least one specific type of voice service, wherein the bearer control information comprises the at least one allocation priority reserved for at least one specific type of voice service for the first packet switched bearer or the second packet switched bearer.

18. The method according to claim 17, wherein the change of the operative condition for the first packet switched bearer is a change of service coverage for the first packet switched bearer occurs, a trigger from the core network, or a change of a traffic load on the first packet switched bearer above a predetermined threshold.

19. The method according to claim 17, wherein the bearer control information is transmitted when the user terminal changes from an idle mode to a connected mode.

20. The method according to claim 17, wherein the bearer control information is transmitted when the user terminal is in a connected mode.

21. The method according to claim 17, wherein the bearer control information is transmitted in response to a service request from the user terminal.

22. The method according to claim 17, wherein the bearer control information is transmitted with respect to an established packet switched bearer.

23. A network control node that controls a network node handling multiple bearers as an association between a user terminal and a packet switched network domain of a core network, wherein the multiple bearers comprise a first packet switched bearer related to a voice service and at least a second packet switched bearer, the network control node comprising:
   at least one interface to establish a transmission link,
   at least one processor, and
   a memory comprising instructions executed by the at least one processor to perform operations comprising:
   generate bearer control information indicating a possibility for a handover of at least one second packet switched bearer from a first packet switched access to a second packet switched access, the possibility being expressed under condition that a transfer of the voice service is initiated from the first packet switched bearer to a circuit switched bearer upon change of an operative condition for the first packet switched bearer; and to
   transmit the generated bearer control information to the network node for selectively initiating the handover in response to comparing an allocation priority of the first packet switched bearer with at least one allocation priority reserved for at least one specific type of voice service, and declining the handover upon coincidence of the allocation priority of the first packet switched bearer with the at least one allocation priority reserved for at least one specific type of voice service,
   wherein the bearer control information comprises the at least one allocation priority reserved for at least one specific type of voice service for the first packet switched bearer or the second packet switched bearer.

24. The network control node according to claim 23, wherein the change of the operative condition for the first packet switched bearer is a change of service coverage for the first packet switched bearer occurs, a trigger from the core network, or a change of a traffic load on the first packet switched bearer above a predetermined threshold.

25. A communication system that controls multiple bearers as an association between a user terminal and a packet switched network domain of a core network, wherein the multiple bearers comprise a first packet switched bearer related to a voice service and at least one second packet switched bearer, the communication system comprising:
   a radio access node that handles multiple bearers as an association between a user terminal and a packet switched network domain of a core network, wherein the multiple bearers comprise a first packet switched bearer related to a voice service and at least a second packet switched bearer, the radio access node comprising:
   at least one interface to establish a transmission link,
   at least one processor, and
   a memory comprising instructions executed by the at least one processor to perform operations comprising:
   configuring bearer control information by registering, at the radio access node, at least one allocation priority reserved for at least one specific type of voice service for the first packet switched bearer or the second packet switched bearer;
   initiating a transfer of the voice service from the first packet switched bearer to a circuit switched bearer upon change of an operative condition for the first packet switched bearer; and
   selectively initiating a handover of the at least one second packet switched bearer, concurrent in time with the transfer of the voice service, from a first packet switched access to a second packet switched access based on bearer control information indicating possibility of a parallel handover,
   wherein the selectively initiating the handover comprises:
   comparing an allocation priority of the first packet switched bearer with the at least one allocation priority reserved for at least one specific type of voice service; and
   declining the parallel handover upon coincidence of the allocation priority of the first packet switched bearer with the at least one allocation priority reserved for at least one specific type of voice service; and
   a network control node that controls a network node handling multiple bearers as an association between a user terminal and a packet switched network domain of a core network, wherein the multiple bearers comprise a first packet switched bearer related to a voice service and at least a second packet switched bearer, the network control node comprising:
   at least one interface to establish a transmission link,
   at least one processor, and
   a memory comprising instructions executed by the at least one processor to perform operations comprising:
   generate bearer control information indicating a possibility for a handover of at least one second packet switched bearer from a first packet switched access to a second packet switched access, the possibility being expressed under condition that a transfer of the voice service is initiated from the first packet switched bearer to a circuit switched bearer upon change of an operative condition for the first packet switched bearer; and to
   transmit the generated bearer control information to the network node.

26. A computer program product comprising:
a non-transitory computer readable storage medium comprising computer readable program code embodied in the medium that when executed by at least one processor of a radio access node, causes the at least one processor of the radio access node perform operations comprising:
configuring bearer control information by registering, at the radio access node, at least one allocation priority reserved for at least one specific type of voice service for the first packet switched bearer or the second packet switched bearer;
initiating a transfer of the voice service from the first packet switched bearer to a circuit switched bearer upon change of an operative condition for the first packet switched bearer; and
selectively initiating a handover of the at least one second packet switched bearer, concurrent in time with the transfer of the voice service, from a first packet switched access to a second packet switched access based on bearer control information indicating possibility of a parallel handover,
wherein the selectively initiating the handover comprises:
comparing an allocation priority of the first packet switched bearer with the at least one allocation priority reserved for at least one specific type of voice service; and
declining the parallel handover upon coincidence of the allocation priority of the first packet switched bearer with the at least one allocation priority reserved for at least one specific type of voice service.

27. A computer program product comprising a non-transitory computer readable storage medium comprising program code to be executed by at least one processor of a network node, thereby causing the at least one processor of the network node perform operations comprising:
generating bearer control information indicating a possibility for a handover of at least one second packet switched bearer from a first packet switched access to a second packet switched access, the possibility being expressed under condition that a transfer of the voice service is initiated from the first packet switched bearer to a circuit switched bearer upon change of an operative condition for the first packet switched bearer; and
transmitting the bearer control information to the radio access node for selectively initiating the handover in response to comparing an allocation priority of the first packet switched bearer with at least one allocation priority reserved for at least one specific type of voice service, and declining the handover upon coincidence of the allocation priority of the first packet switched bearer with the at least one allocation priority reserved for at least one specific type of voice service,
wherein the bearer control information comprises the at least one allocation priority reserved for at least one specific type of voice service for the first packet switched bearer or the second packet switched bearer.

* * * * *